(12) United States Patent
Shousha et al.

(10) Patent No.: US 10,819,120 B2
(45) Date of Patent: Oct. 27, 2020

(54) CONVERTER APPARATUS FOR ENERGY HARVESTING AND ENERGY GENERATOR HAVING SUCH A CONVERTER APPARATUS, AND USE OF SUCH A CONVERTER APPARATUS

(71) Applicant: Würth Elektronik eiSos GmbH & Co. KG, Waldenburg (DE)

(72) Inventors: Mahmoud Shousha, Eching (DE); Martin Haug, Munich (DE)

(73) Assignee: Würth Elektronik eiSos GmbH & Co. KG, Waldenburg (DE)

( * ) Notice: Subject to any disclaimer, the term of this patent is extended or adjusted under 35 U.S.C. 154(b) by 407 days.

(21) Appl. No.: 15/833,186

(22) Filed: Dec. 6, 2017

(65) Prior Publication Data

US 2018/0166900 A1 Jun. 14, 2018

(30) Foreign Application Priority Data

Dec. 9, 2016 (DE) .......... 10 2016 224 639

(51) Int. Cl.
*H02J 7/00* (2006.01)
*H02M 7/217* (2006.01)
(Continued)

(52) U.S. Cl.
CPC ............... *H02J 7/00* (2013.01); *H02J 7/04* (2013.01); *H02J 50/00* (2016.02); *H02M 7/217* (2013.01); *H02J 2207/20* (2020.01)

(58) Field of Classification Search
USPC ...................................................... 320/137
See application file for complete search history.

(56) References Cited

U.S. PATENT DOCUMENTS 9,871,402 B2 * 1/2018 Hasegawa ............. H02J 7/1423
2009/0189579 A1 * 7/2009 Melanson ............... H02J 7/342
323/282
(Continued)

FOREIGN PATENT DOCUMENTS

CN 104054249 A 9/2014
DE 102008064402 A1 7/2010
(Continued)

OTHER PUBLICATIONS

A. Sriramulu, B. Madhu. and A. Nachiappan, Implementation of an efficient AC-DC converter for low voltage energy harvesting, 2012 IEEE International Conference on Engineering Education: Innovative Practices and Future Trends (AICERA), Kottayam, 2012, pp. 1-6.

(Continued)

*Primary Examiner* — Samuel Berhanu
(74) *Attorney, Agent, or Firm* — McGlew and Tuttle, P.C.

(57) ABSTRACT

A converter apparatus for energy harvesting comprises a converter and an associated control device. The converter comprises a first charging circuit for charging a galvanic energy store (8) when a positive voltage of a connected energy harvesting device is applied and a second charging circuit for charging the galvanic energy store when a negative voltage of the connected energy harvesting device is applied. The charging circuits each have an electronic switch and an electrical energy store connected in series therewith. The control device is used to actuate the electronic switches on the basis of a polarity of the applied voltage of the energy harvesting device.

16 Claims, 5 Drawing Sheets

(51) Int. Cl.
*H02J 50/00* (2016.01)
*H02J 7/04* (2006.01)

(56) References Cited

U.S. PATENT DOCUMENTS

| | | |
|---|---|---|
| 2011/0181115 A1 | 7/2011 | Ivanov |
| 2013/0162236 A1 | 6/2013 | Yang |
| 2014/0293657 A1 | 10/2014 | Chen et al. |
| 2015/0018181 A1 | 1/2015 | Li et al. |
| 2016/0087532 A1 | 3/2016 | Stanzione |
| 2016/0099660 A1 | 4/2016 | Khaligh et al. |
| 2016/0261184 A1 | 9/2016 | Chen et al. |
| 2019/0173376 A1* | 6/2019 | Vervaart ............... H02J 7/0029 |

FOREIGN PATENT DOCUMENTS

| | | |
|---|---|---|
| DE | 102009014702 A1 | 10/2010 |
| RU | 2421872 C1 | 6/2011 |
| TW | 1491155 B | 7/2015 |

OTHER PUBLICATIONS

C. Y. Hsieh, M. Moallem and F. Golnaraghi, A simple Bi-directional bridgeless AC/DC buck-boost converter for automotive energy harvesting, IECON 2014—40th Annual Conference of the IEEE Industrial Electronics Society, Dallas, TX, 2014, pp. 1937-1943.

H. Wang, Y. Tang and A. Khaligh, A Bridgeless Boost Rectifier for Low-Voltage Energy Harvesting Applications, IEEE Transactions on Power Electronics, vol. 28, No. 11, pp. 5206-5214, Nov. 2013.

Singh Shikha et al., Power corrected bridgeless converter based switched mode power supply factor, IET Power Electro, IET, UK, Bd. 9, Nr. 8, Jun. 29, 2016, pp. 1684-1693.

Lee Chi-Kwan et al., High-Frequency-Fed Unity Power-Factor AC-DC Power Converter With One Switching Per C, IEEE Transactions on Power Electronics, Institute of Electrical and Electronics Engineers, USA, Bd. 30, Nr. 4, Apr. 1, 2015, pp. 2148-2156.

\* cited by examiner $Z_{1p}: 0 < t < D \cdot T_s$ $Z_{2p}: D \cdot T_s < t < (1-D) \cdot T_s$ $Z_{1n}: 0 < t < D \cdot T_s$ $Z_{2n}: D \cdot T_s < t < (1-D) \cdot T_s$ $Z_{1p}: 0 < t < D \cdot T_s$ $Z_{2p}: D \cdot T_s < t < (1-D) \cdot T_s$

CONVERTER APPARATUS FOR ENERGY HARVESTING AND ENERGY GENERATOR HAVING SUCH A CONVERTER APPARATUS, AND USE OF SUCH A CONVERTER APPARATUS

CROSS-REFERENCES TO RELATED APPLICATIONS

This application claims the priority of German Patent Application, Serial No. 10 2016 224 639.9, filed Dec. 9, 2016, pursuant to 35 U.S.C. 119(a)-(d), the content of which is incorporated herein by reference in its entirety as if fully set forth herein.

FIELD OF THE INVENTION

The invention relates to a converter apparatus for energy harvesting and to an energy generator having such a converter apparatus. Further, the invention relates to the use of such a converter apparatus.

BACKGROUND OF THE INVENTION

Energy harvesting means the harvesting of small amounts of electric power from sources in the surroundings of a mobile electrical appliance, such as from the ambient temperature or from vibrations, for example. Applicable energy harvesting devices, such as thermoelectric generators or piezoelectric crystals, for example, provide either a voltage of the same polarity (DC voltage) or a voltage of alternating polarity (AC voltage). In order to be able to use the energy provided by means of the energy harvesting device efficiently, a converter apparatus is required.

SUMMARY OF THE INVENTION

The invention is based on an object of providing a simple, reliable, efficient and universally usable converter apparatus for energy harvesting that can be operated both at a voltage of the same polarity, provided by an energy harvesting device, and at a voltage of alternating polarity.

This object is achieved by a converter apparatus for energy harvesting, comprising
a converter having
a first input connection and a second input connection for connection to an energy harvesting device,
a first output connection and a second output connection for connection to a galvanic energy store,
a first charging circuit for charging the galvanic energy store with a positive voltage of the energy harvesting device that is applied to the input connections, having
a first electronic switch and
a first electrical energy store connected in series with the first electronic switch,
a second charging circuit for charging the galvanic energy store with a negative voltage of the energy harvesting device that is applied to the input connections, having
a second electronic switch and
a second electrical energy store connected in series with the second electronic switch,
a control device for actuating the first electronic switch and the second electronic switch on the basis of a polarity of the voltage of the energy harvesting device that is applied to the input connections.

The converter is configured as a step up converter. As a result of the converter comprising a first charging circuit that can be operated by means of a positive voltage applied to the input connections and a second charging circuit that can be operated by means of a negative voltage applied to the input connections, the converter allows the conversion of a voltage of alternating polarity applied to the input connections into a DC voltage (AC/DC conversion) and the conversion of a voltage of the same polarity applied to the input connections into a DC voltage (DC/DC conversion). To this end, the charging circuits each have an electronic switch and an electrical energy store connected in series therewith. The control device is used to actuate the electrical switches on the basis of the polarity of the voltage applied to the input connections, so that, depending on the polarity, the first charging circuit or the second charging circuit or the two charging circuits alternately are operated.

If the converter apparatus is operated with an energy harvesting device generating a voltage of alternating polarity, the first capacitor and the second capacitor are each connected with one of the output connections (AC/DC conversion). If the converter apparatus is operated with an energy harvesting device generating a voltage of the same polarity, either the first capacitor or the second capacitor are connected with the output connections depending on the polarity (DC/DC conversion).

A converter apparatus, in which the first charging circuit and the second charging circuit are connected in parallel with one another, is of simple design and universally usable. As a result of the first charging circuit and the second charging circuit being connected in parallel with one another, they can easily be operated as required by means of the associated electronic switches. The respective electronic switch is connected to one of the input connections and the respective associated energy store is connected to the other of the input connections. Preferably, the energy stores are connected to the first input connection and the electronic switches are connected to the second input connection. This achieves a symmetric design for the converter apparatus.

A converter apparatus, in which the first energy store is connected to the first output connection and the second energy store is connected to the second output connection, easily allows the provision of an output voltage. To operate a mobile electronic appliance, a rechargeable galvanic energy store or a rechargeable battery can be connected to the output connections. The rechargeable galvanic energy store can have an electrical load connected in parallel with it that can be operated by means of the galvanic energy store and/or the provided output voltage. The mobile electronic appliance is a portable electronic appliance and/or an electronic appliance in a vehicle, for example. In particular, the first energy store is additionally connected to a third output connection and/or the second energy store is additionally connected to a fourth output connection. If a voltage of the same polarity is applied to the input connections, then the rechargeable energy store can be connected to the first and third output connections when the voltage is positive and can be connected to the second and fourth output connections when the voltage is negative. The rechargeable galvanic energy store can again have an electrical load connected in parallel with it.

A converter apparatus, in which one of the input connections is connected to a reference node, ensures a simple design and operation. The reference node provides a reference potential in a suitable manner. Preferably, the input connection connected to the electronic switches is connected to the reference node. This allows simple actuation of the electronic switches.

A converter apparatus, in which the first electronic switch comprises a series circuit containing a first electronic switching element and a second electronic switching element, ensures a high level of reliability and efficiency. As a result of two electronic switching elements being connected in series, parasitic currents and losses caused thereby are avoided. The two electronic switching elements have a back-to-back arrangement, in particular. This avoids losses and a malfunction owing to parasitic currents. Parasitic currents are caused particularly by inverse diodes (body diodes). On account of the back-to-back arrangement, the inverse diodes have different reverse directions. The electronic switching elements are selected from the group comprising field effect transistor (n-channel or p-channel) and bipolar transistor (NPN or PNP). The electronic switching elements are preferably configured as MOSFETs, particularly as n-channel MOSFETs.

A converter apparatus, in which a first inverse diode configured in parallel with the first electronic switching element and a second inverse diode configured in parallel with the second electronic switching element have opposite reverse directions, ensures a high level of reliability and a high level of efficiency. The electronic switching elements have a back-to-back arrangement, so that the parasitic inverse diodes have opposite reverse directions. The arrangement of the switching elements therefore ensures that at least one of the inverse diodes is reversed biased both when a negative voltage is applied and when a positive voltage is applied.

A converter apparatus, in which the second electronic switch comprises a series circuit containing a third electronic switching element and a fourth electronic switching element, ensures a high level of reliability and efficiency. As a result of two electronic switching elements being connected in series, parasitic currents and losses caused thereby are avoided. The two electronic switching elements have a back-to-back arrangement, in particular. This avoids losses and a malfunction owing to parasitic currents. Parasitic currents are caused particularly by inverse diodes (body diodes). On account of the back-to-back arrangement, the inverse diodes have different reverse directions. The electronic switching elements are selected from the group comprising field effect transistor (n-channel or p-channel) and bipolar transistor (NPN or PNP). The electronic switching elements are preferably configured as MOSFETs, particularly as n-channel MOSFETs.

A converter apparatus, in which a third inverse diode configured in parallel with the third electronic switching element and a fourth inverse diode configured in parallel with the fourth electronic switching element have opposite reverse directions, ensures a high level of reliability and a high level of efficiency. The electronic switching elements have a back-to-back arrangement, so that the parasitic inverse diodes have opposite reverse directions. The arrangement of the switching elements therefore ensures that at least one of the inverse diodes is reverse biased both when a negative voltage is applied and when a positive voltage is applied.

A converter apparatus, in which the first energy store comprises a first coil, a first capacitor and a first blocking element, ensures simple and efficient storage and provision of electric power. The first coil is connected in parallel with the first capacitor. The first blocking element is connected in series with the first coil or the first capacitor. The first blocking element is configured as a diode, for example. The first blocking element is arranged such that in a first switching state, if the first electronic switch is switched on, energy is stored in the first coil by means of the positive voltage applied to the input connections. In the first switching state, charging of the first capacitor is prevented by the first blocking element. In a subsequent second switching state, if the first electronic switch is switched off, the first capacitor is charged by the first coil by means of a flow current via the first blocking element.

A converter apparatus, in which the second energy store comprises a second coil, a second capacitor and a second blocking element, ensures simple and efficient storage and provision of electric power. The second coil is connected in parallel with the second capacitor. The second blocking element is connected in series with the second coil or the second capacitor. The second blocking element is configured as a diode, for example. The second blocking element is arranged such that in a first switching state, if the second electronic switch is switched on, energy is stored in the second coil by means of the negative voltage applied to the input connections. In the first switching state, charging of the second capacitor is prevented by the second blocking element. In a subsequent second switching state, if the second electronic switch is switched off, the second capacitor is charged by the second coil by means of a flow of current via the second blocking element.

A converter apparatus, in which the first energy store comprises a first capacitor and the second energy store comprises a second capacitor, and in which the first capacitor and the second capacitor are connected to a respective one of the output connections, ensures simple and efficient provision of an output voltage for recharging the galvanic energy store. The converter apparatus is therefore operated as an AC/DC converter.

A converter apparatus, in which a smoothing capacitor is connected in parallel with the input connections, ensures reliable and efficient operation. The smoothing capacitor smooths voltage spikes in the voltage of the energy harvesting device that is applied to the input connections. The smoothing capacitor moreover simplifies the ascertainment of an input impedance.

A converter apparatus, in which the control device comprises a first switching sequence when a positive voltage is applied to the input connections, wherein it holds for the first switching sequence that:

|          | $Z_{1p}$ | $Z_{2p}$ |
|----------|----------|----------|
| $Q_{1p}$ | 1        | 0        |
| $Q_{2p}$ | 1        | 0        |
| $Q_{1n}$ | 0        | 0        |
| $Q_{2n}$ | 0        | 0        | where
- $Q_{1p}$ and $Q_{2p}$ denote two series-connected electronic switching elements of the first electronic switch,
- $Q_{1n}$ and $Q_{2n}$ denote two series-connected electronic switching elements of the second electronic switch,
- $Z_{1p}$ and $Z_{2p}$ denote two successive switching states of the first switching sequence, and 1 means ON and 0 means OFF, ensures simple, reliable and efficient operation when a positive voltage is applied to the input connections. The control device preferably comprises a polarity detection unit that detects when a positive voltage is applied to the input connections and transmits an appropriate polarity signal to a switching unit. The switching unit switches the electronic switching elements in accordance with the first switching sequence. The duty cycle D is preferably used to set an input impedance of the converter. The duty cycle D denotes the ratio of the duration of the first switching state $Z_{1p}$ to the total duration of the switching states $Z_{1p}$ and $Z_{2p}$, that is to say to the period duration $T_S$.

A converter apparatus, in which the control device comprises a second switching sequence when a negative voltage is applied to the input connections, wherein it holds for the second switching sequence that:

|          | $Z_{1n}$ | $Z_{2n}$ |
|----------|----------|----------|
| $Q_{1p}$ | 0        | 0        |
| $Q_{2p}$ | 0        | 0        |
| $Q_{1n}$ | 1        | 0        |
| $Q_{2n}$ | 1        | 0        | where
- $Q_{1p}$ and $Q_{2p}$ denote two series-connected electronic switching elements of the first electronic switch,
- $Q_{1n}$ and $Q_{2n}$ denote two series-connected electronic switching elements of the second electronic switch,
- $Z_{1n}$ and $Z_{2n}$ denote two successive switching states of the second switching sequence, and 1 means ON and 0 means OFF, ensures simple, reliable and efficient operation when a negative voltage is applied to the input connections. The control device preferably comprises a polarity detection unit that detects when a negative voltage is applied to the input connections and transmits an appropriate polarity signal to a switching unit. The switching unit switches the electronic switching elements in accordance with the second switching sequence. The duty cycle D is preferably used to set an input impedance of the converter. The duty cycle D denotes the ratio of the duration of the first switching sate $Z_{1n}$ to the total duration of the switching states $Z_{1n}$ and $Z_{2n}$, that is to say to the period duration $T_S$.

A converter apparatus, in which the control device comprises an impedance regulator for setting an input impedance, which impedance regulator alters the actuation of the electronic switches on the basis of an ascertained input impedance and a setpoint input impedance, ensures a high level of efficiency. The control device has a control loop implemented in it for the input impedance of the converter. The input impedance is ascertained at the input connections. To this end, the control device comprises a voltage measurement sensor for measuring the voltage applied to the input connections and a current measurement sensor for measuring a current flowing from the energy harvesting device to the converter. An input impedance is ascertained from the measured voltage and the measured current by means of the control device. From a setpoint input impedance and the ascertained input impedance, a control error or a difference is determined that is supplied to the impedance regulator. The impedance regulator is configured as a PID controller, for example. The impedance regulator provides a switching unit with a manipulated variable. The manipulated variable is used to set the duty cycle D and hence the input impedance of the converter. The switching unit is configured as a digital pulse width modulator, for example. The input impedance is preferably regulated such that the input impedance is purely resistive and hence the measured voltage and the measured current are substantially in phase. The setpoint input impedance is ascertained empirically in experiments, in particular. The setpoint input impedance is a resistance value, for example, at which a high level of efficiency, particularly a maximum efficiency, is achieved during energy harvesting.

The invention is also based on an object of providing a simple, reliable and efficient energy generator that provides both energy from a voltage of alternating polarity and energy from a voltage of the same polarity.

This object is achieved by an energy generator having a converter apparatus according to the invention and an energy harvesting device, connected to the input connections, for providing a voltage. The advantages of the energy generator according to the invention correspond to the advantages already described for the converter apparatus. The converter apparatus can be operated both by means of an energy harvesting device that provides a voltage of the same polarity and by means of an energy harvesting device that provides a voltage of alternating polarity. Accordingly, the energy harvesting device is selected from the group comprising piezoelectric crystals and thermoelectric generators, for example. Preferably, the output connections of the converter apparatus have a galvanic energy store connected to them. The galvanic energy store is configured to be rechargeable.

Use of the converter apparatus according to the invention, particularly of the energy generator according to the invention, allows a high level of flexibility and universal usability in a simple manner. The converter apparatus can be operated firstly using an energy harvesting device for providing a voltage of the same polarity, so that the converter apparatus is operated as a DC/DC converter. Secondly, the converter apparatus can be operated using an energy harvesting device for providing a voltage of alternating polarity, so that the converter apparatus is operated as an AC/DC converter. The converter apparatus automatically customizes itself to the connected energy harvesting device, so that the use of the converter apparatus is simple and flexible.

Further features, advantages and details of the invention will emerge from the description of multiple exemplary embodiments that follows.

DESCRIPTION OF THE PREFERRED EMBODIMENTS

Figure 1:
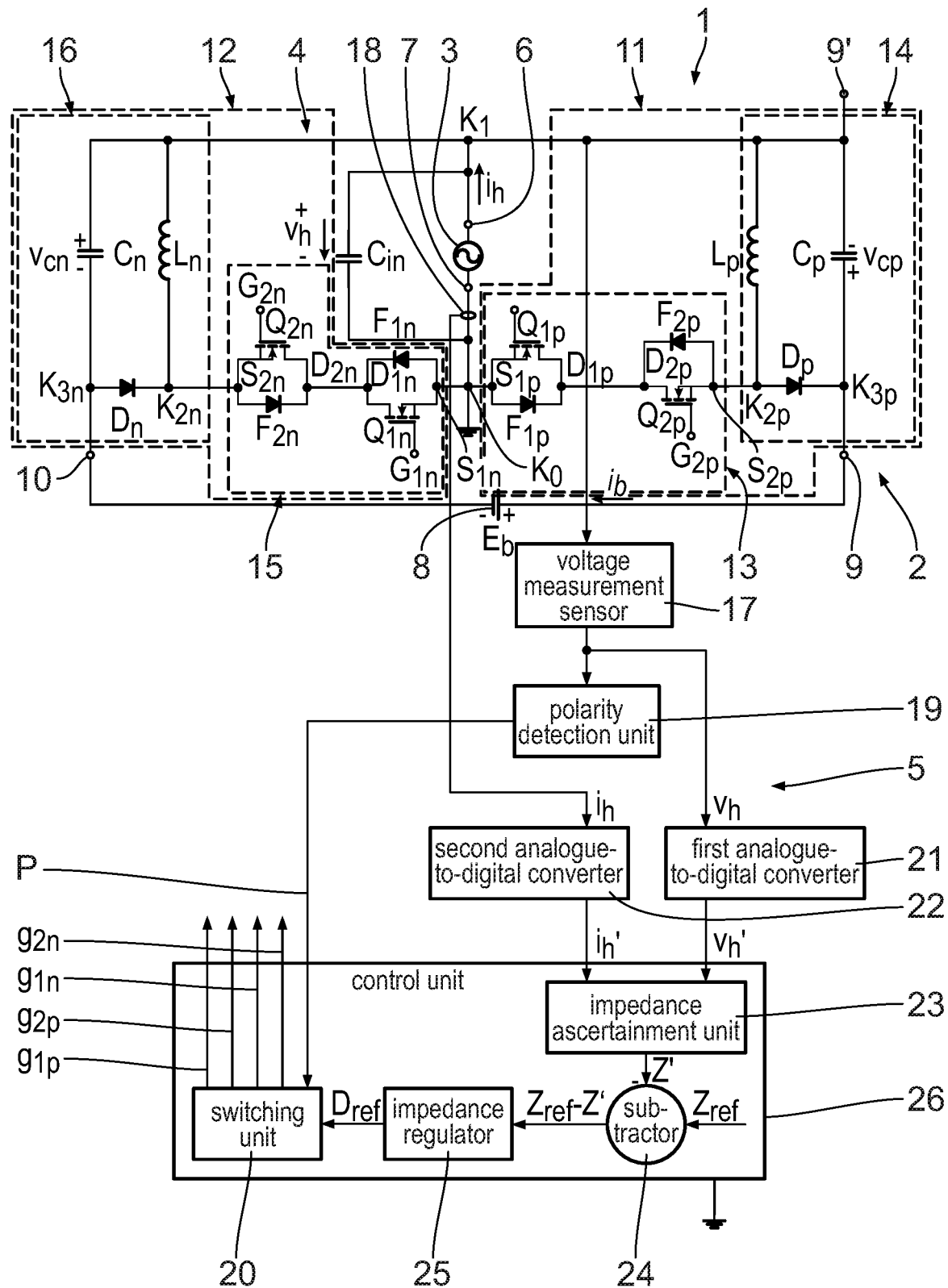
FIG. 1 shows a schematic depiction of an energy generator according to a first exemplary embodiment with a converter apparatus and an energy harvesting device connected thereto for providing a voltage of alternating polarity.
Figure 2:
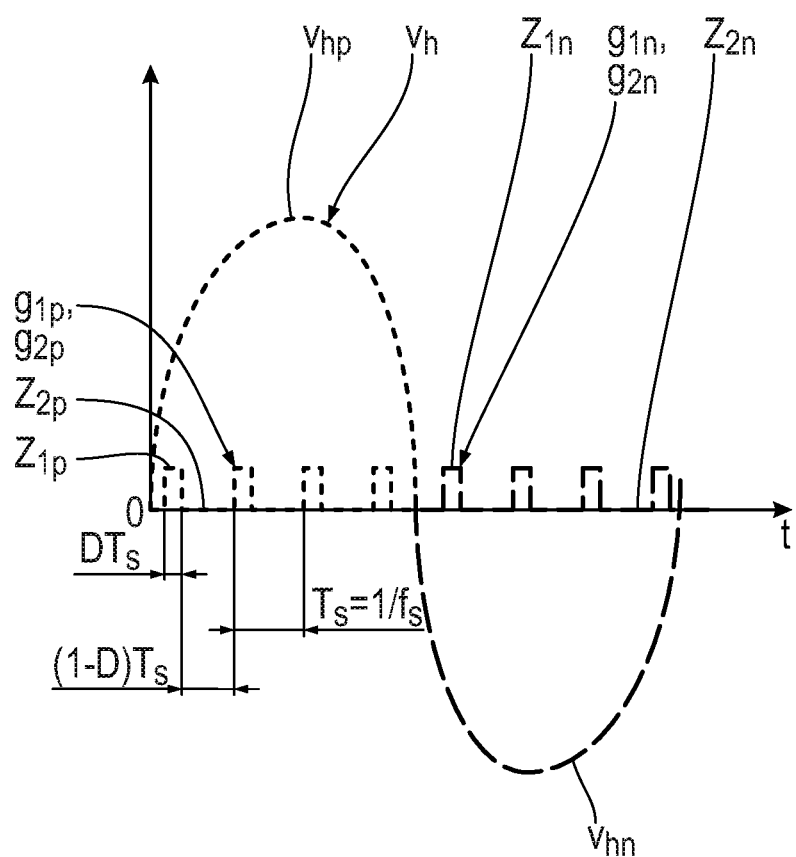
FIG. 2 shows a time characteristic for the voltage provided by the energy harvesting device and for the switching pulses generated by a control device for actuating a converter of the converter apparatus.

There follows a description of a first exemplary embodiment of the invention with reference to FIGS. 1 to 6. An energy generator 1 comprises a converter apparatus 2 and an energy harvesting device 3. The converter apparatus 2 comprises a converter 4 and an associated control device 5. The energy harvesting device 3 is connected to a first input connection 6 and a second input connection 7. The energy generator 1 is used for charging a rechargeable galvanic energy store 8. The galvanic energy store 8 is connected to a first output connection 9 and a second output connection 10 of the converter 4. The converter 4 further has a third output connection 9', which is not connected up in the first exemplary embodiment.

The energy harvesting device 3 provides a voltage $v_h$ that has an alternating polarity (AC voltage). The voltage $v_h$ over time t is depicted by way of example in FIG. 2. The portion of the voltage $v_h$ with positive polarity is denoted by $v_{hp}$ below and the portion of the voltage with negative polarity by $v_{hn}$.

The converter 4 has a smoothing capacitor $C_{in}$ to smooth the voltage $v_h$, said smoothing capacitor being connected in parallel with the input connections 6, 7 and the energy generation device 3. The smoothing capacitor $C_{in}$ is connected to a node $K_1$ and to a reference node $K_0$. The reference node $K_0$ defines a reference potential. The first input connection 6 is connected to the node $K_1$ and the second input connection 7 is connected to the reference node $K_0$.

The converter 4 comprises a first charging circuit 11 for charging the galvanic energy store 8 when the positive voltage $v_{hp}$ is applied and the second charging circuit 12 for charging the galvanic energy store 8 when a negative voltage $v_{hn}$ is applied. The charging circuits 11, 12 are connected to the node $K_1$ and the reference node $K_0$ and connected in parallel with one another.

The first charging circuit 11 comprises a first electronic switch 13 and a first electrical energy store 14 connected in series therewith. The first electronic switch 13 is configured as a series circuit comprising a first electronic switching element $Q_{1p}$ and a second electronic switching element $Q_{2p}$. The electronic switching elements $Q_{1p}$ and $Q_{2p}$ are each configured as a normally-off n-channel MOSFET. A source connection $S_{1p}$ of the first switching element $Q_{1p}$ is connected to the reference node $K_0$. A drain connection $D_{1p}$ of the first switching element $Q_{1p}$ is connected to a drain connection $D_{2p}$ of the second switching element $Q_{2p}$. A source connection $S_{2p}$ of the second switching element $Q_{2p}$ is connected to a node $K_{2p}$ of the first charging circuit 11.

A first parasitic inverse diode $F_{1p}$ is configured in parallel with the first switching element $Q_{1p}$. The first inverse diode $F_{1p}$ is configured with respect to the source connection $S_{1p}$ and the drain connection $D_{1p}$ such that a flow of current in the direction of the source connection $S_{1p}$ is blocked. Accordingly, a second parasitic inverse diode $F_{2p}$ is configured in parallel with the second switching element $Q_{2p}$. The second inverse diode $F_{2p}$ is configured with respect to the source connection $S_{2p}$ and the drain connection $D_{2p}$ such that a flow of current in the direction of the source connection $S_{sp}$ is blocked. The inverse diodes $F_{1p}$ and $F_{2p}$ therefore have opposite reverse directions. The described back-to-back arrangement of the switching elements $Q_{1p}$ and $Q_{2p}$ therefore ensures that at least one of the inverse diodes $F_{1p}$ and $F_{2p}$ is reverse biased both when a positive voltage is applied to the first electronic switch 13 and when a negative voltage is applied. This avoids parasitic currents and resultant losses.

The first energy store 14 comprises a first coil $L_p$, a first capacitor $C_p$ and a first blocking element $D_p$. The first coil $L_p$ is connected to the node $K_1$ and the node $K_{2p}$. The first capacitor $C_p$ is connected to the node $K_1$ and a node $K_{3p}$. The first blocking element $D_p$ is arranged between the node $K_{2p}$ and the node $K_{3p}$ such that a flow of current in the direction of the node $K_{2p}$ is blocked. The first blocking element $D_p$ is configured as a diode. The first output connection 9 is connected to the node $K_{3p}$. The third output connection 9' is connected to the node $K_1$.

The second charging circuit 12 comprises a second electronic switch 15 and a second electrical energy store 16 connected in series therewith. The second electronic switch 15 is configured as a series circuit comprising a third electronic switching element $Q_{1n}$ and a fourth electronic switching element $Q_{2n}$. The electronic switching elements $Q_{1n}$ and $Q_{2n}$ are each configured as a normally-off n-channel MOSFET. A source connection $S_{1n}$ of the third switching element $Q_{1n}$ is connected to the reference node $K_0$. A drain connection $D_{1n}$ of the third switching element $Q_{1n}$ is connected to a drain connection $D_{2n}$ of the fourth switching element $Q_{2n}$. A source connection $S_{2n}$ of the fourth switching element $Q_{2n}$ is connected to a node $K_{2n}$ of the second charging circuit 12.

A third parasitic inverse diode $F_{1n}$ is configured in parallel with a third switching element $Q_{1n}$. The third inverse diode $F_{1n}$ is configured with respect to the source connection $S_{1n}$ and the drain connection $D_{1n}$ such that a flow of current in the direction of the source connection $S_{1n}$ is blocked. Accordingly, a fourth parasitic inverse diode $F_{2n}$ is configured in parallel with the fourth switching element $Q_{2n}$. The fourth inverse diode $F_{2n}$ is configured with respect to the source connection $S_{2n}$ and the drain connection $D_{2n}$ such that a flow of current in the direction of the source connection $S_{2n}$ is blocked. The inverse diodes $F_{1n}$ and $F_{2n}$ therefore have opposite reverse directions. The described back-to-back arrangement of the switching elements $Q_{1n}$ and $Q_{2n}$ therefore ensures that at least one of the inverse diodes $F_{1n}$ and $F_{2n}$ is reverse biased both when a positive voltage is applied to the second electronic switch 15 and when a negative voltage is applied. This avoids parasitic currents and resultant losses.

The second energy store 16 comprises a second coil $L_n$, a second capacitor $C_n$ and a second blocking element $D_n$. The second coil $L_n$ is connected to the node $K_1$ and the node $K_{2n}$. The second capacitor $C_n$ is connected to the node $K_1$ and a node $K_{3n}$. The second blocking element $D_n$ is arranged between the node $K_{2n}$ and the node $K_{3n}$ such that a flow of current in the direction of the node $K_{3n}$ is blocked. The second blocking element $D_n$ is configured as a diode. The second output connection 10 is connected to the node $K_{3n}$.

Figure 3:
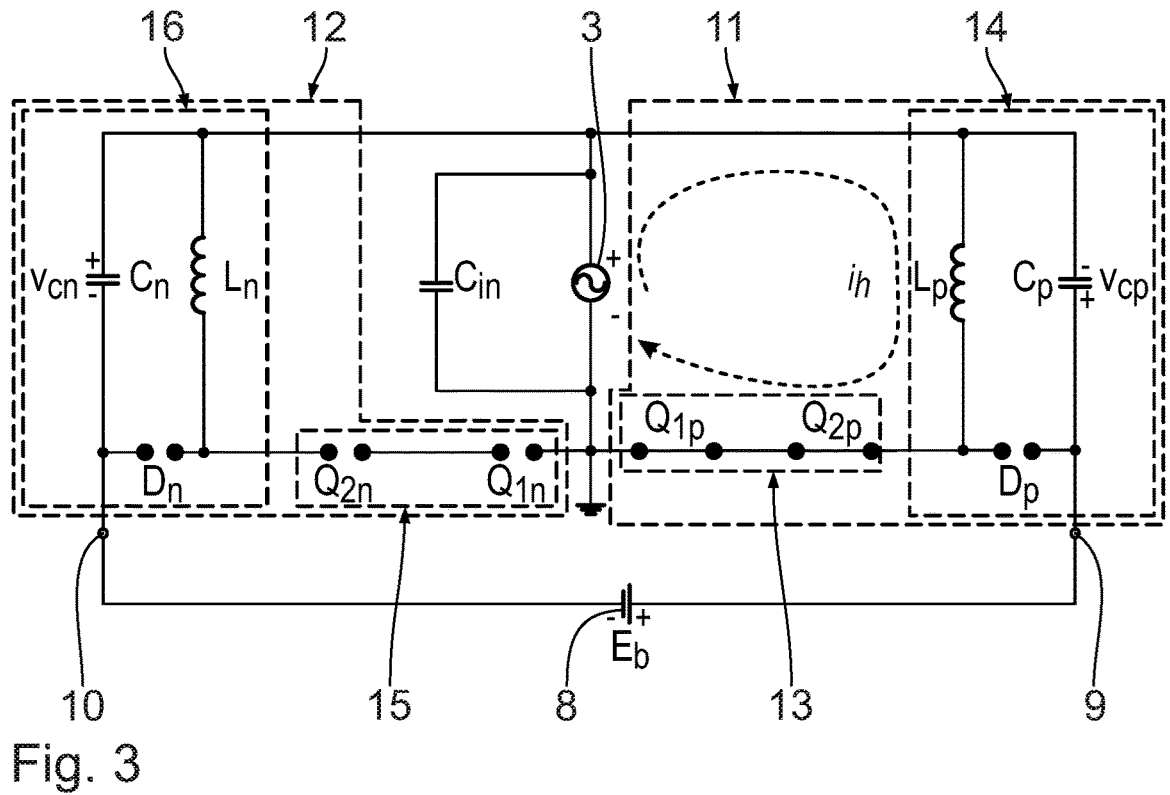
FIG. 3 shows a schematic depiction of a first switching state of the converter apparatus when a positive voltage of the energy harvesting device is provided.
Figure 4:
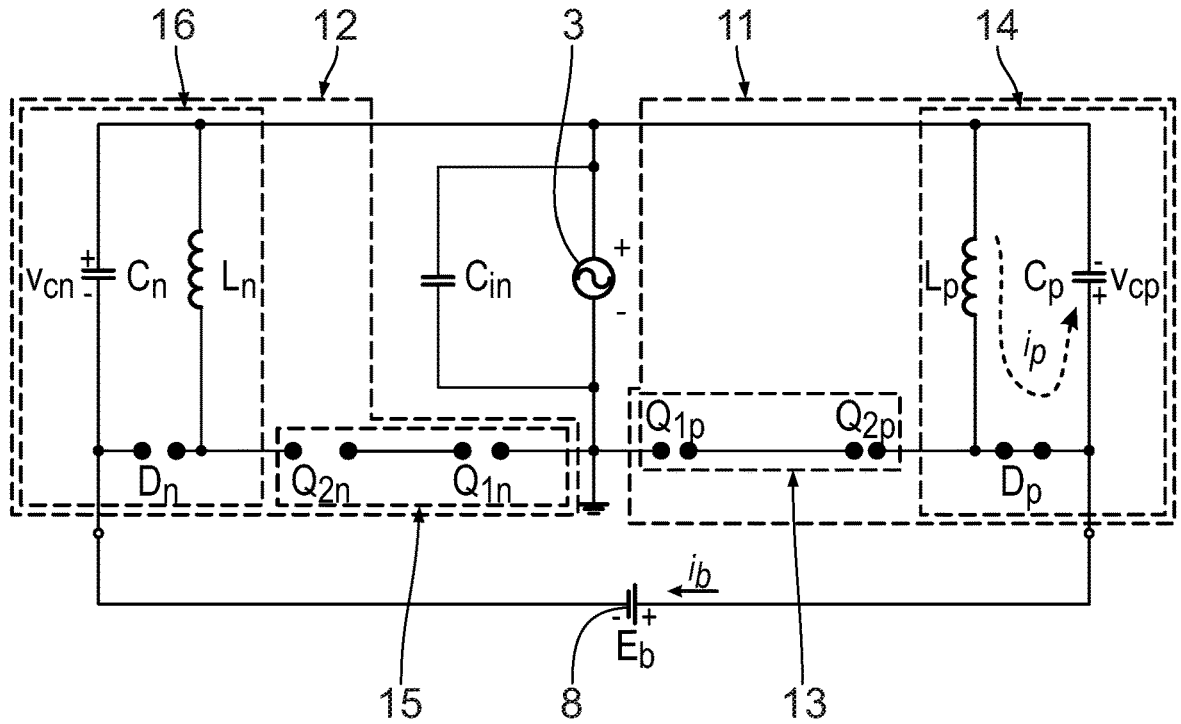
FIG. 4 shows a schematic depiction of a second switching state of the converter apparatus when a positive voltage of the energy harvesting device is provided.

The control device 5 is used to actuate the first electronic switch 13 and the second electronic switch 15 on the basis of the polarity of the voltage $v_h$, that is to say on the basis of the positive voltage $v_{hp}$ and the negative voltage $v_{hn}$. The control device 5 is connected to the reference potential. The control device 5 configured such that a first switching sequence with a first switching state $Z_{1p}$ and a subsequent second switching state $Z_{2p}$ is realized when the positive voltage $v_{hp}$ is applied. It holds for the first switching sequence that:

|          | $Z_{1p}$ | $Z_{2p}$ |
|----------|----------|----------|
| $Q_{1p}$ | 1        | 0        |
| $Q_{2p}$ | 1        | 0        |
| $Q_{1n}$ | 0        | 0        |
| $Q_{2n}$ | 0        | 0        | where 1 means ON and 0 means OFF. The switching state $Z_{1p}$ is illustrated in FIG. 3 and the switching state $Z_{2p}$ is illustrated in FIG. 4.

Figure 5:
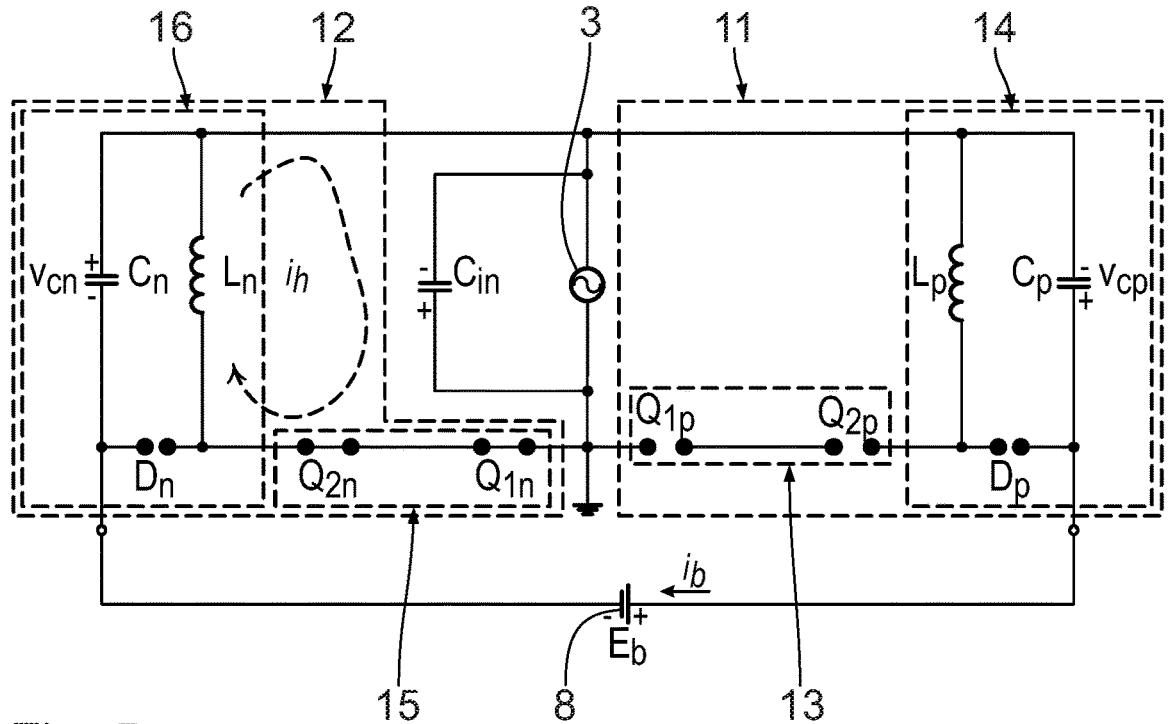
FIG. 5 shows a schematic depiction of a first switching state of the converter apparatus when a negative voltage of the energy harvesting device is provided.
Figure 6:
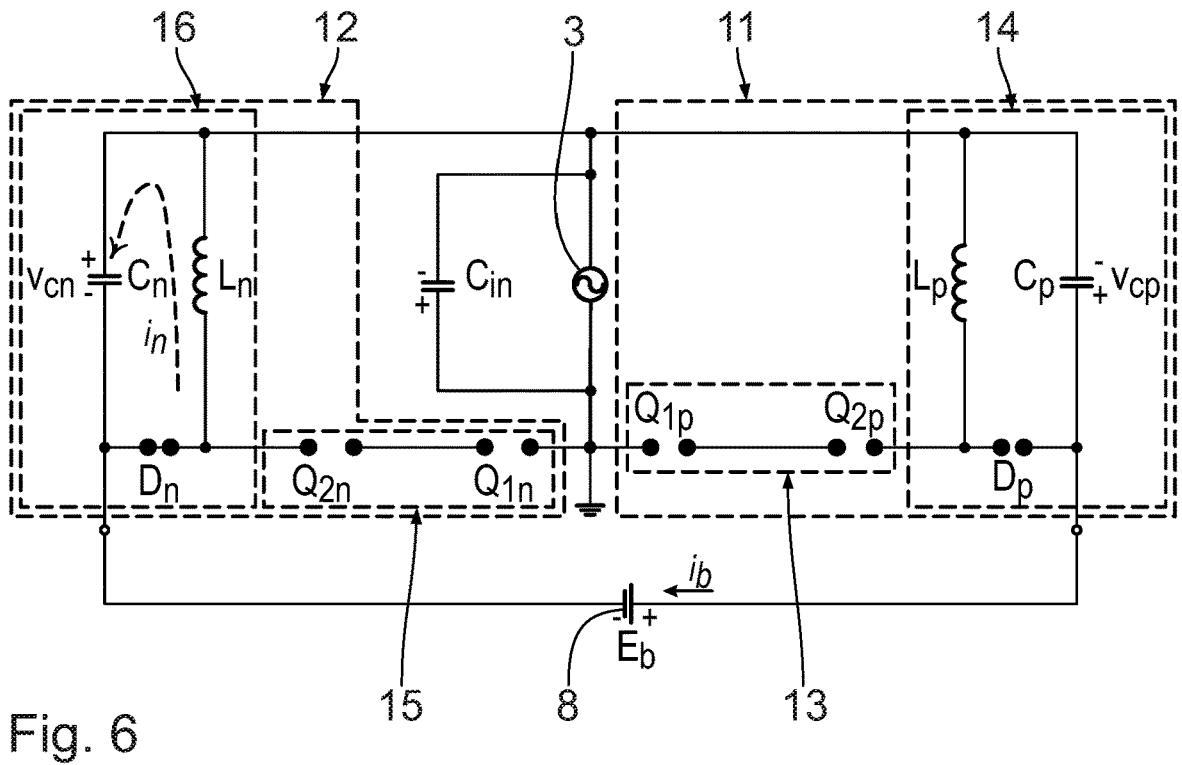
FIG. 6 shows a schematic depiction of a second switching state of the converter apparatus when a negative voltage of the energy harvesting device is provided.

The control device 5 is further configured such that a second switching sequence with a first switching state $Z_{1n}$ and a subsequent second switching state $Z_{2n}$ is realized when the negative voltage $v_{hn}$ is applied. It holds for the second switching sequence that:

|          | $Z_{1n}$ | $Z_{2n}$ |
|----------|----------|----------|
| $Q_{1p}$ | 0        | 0        |
| $Q_{2p}$ | 0        | 0        |
| $Q_{1n}$ | 1        | 0        |
| $Q_{2n}$ | 1        | 0        | where 1 means ON and 0 means OFF. The switching state $Z_{1n}$ is illustrated in FIG. 5 and the switching state $Z_{2n}$ is illustrated in FIG. 6.

The first switching sequence and the second switching sequence each extend over a period duration $T_S$. It holds for the period duration $T_S$ that: $T_S=1/f_S$, where $f_S$ denotes a constant switching frequency of the control device 5. The respective first switching state $Z_{1p}$ or $Z_{1n}$ has the duration $D \cdot T_S$ and the respective associated second switching state $Z_{2p}$ or $Z_{2n}$ has the duration $(1-D) \cdot T_S$, where D denotes a duty cycle.

The control device 5 comprises a voltage measurement sensor 17 for measuring the voltage $v_h$ and a current measurement sensor 18 for measuring a current $i_h$. The current $i_h$ flows between the energy harvesting device 3 and the converter 4.

The control device 5 comprises a polarity detection unit 19 that is provided with the measured voltage $v_h$. The polarity detection unit 19 detects whether the voltage $v_h$ is positive or negative. To this end, the polarity detection unit 19 is configured as a zero crossing detection unit (zero cross detection), for example. The polarity detection unit 19 provides an appropriate digital polarity signal P. The polarity detection unit 19 therefore detects the positive voltage $v_{hp}$ and the negative voltage $v_{hn}$. The polarity signal P is supplied to a switching unit 20 of the control device 5. The switching unit 20 generates control voltages $g_{1p}$, $g_{2p}$, $g_{1n}$ and $g_{2n}$ to actuate the switching elements $Q_{1p}$, $Q_{2p}$, $Q_{1n}$ and $Q_{2n}$. The control voltages $g_{1p}$, $g_{2p}$, $g_{1n}$ and $g_{2n}$ are applied to gate connections $G_{1p}$, $G_{2p}$, $G_{1n}$ and $G_{2n}$ of the switching elements $Q_{1p}$, $Q_{2p}$, $Q_{1n}$ and $Q_{2n}$.

The control device 5 comprises a first analogue-to-digital converter 21 that converts the measured voltage $v_h$ into a digital voltage $v_h'$. In addition, the control device 5 has a second analogue-to-digital converter 22 that converts the measured current $i_h$ into a digital current $i_h'$.

To compute an input impedance, the control device 5 has an impedance ascertainment unit 23 that ascertains an input impedance Z' from the digital voltage $v_h'$ and the digital current $i_h'$. The input impedance Z' is a computed value or estimated value for the input impedance Z of the converter 4 and of the galvanic energy store 8 connected thereto that obtains from the point of view of the input connections 6, 7. The control device 5 comprises a subtractor 24 that forms a difference $Z_{ref}-Z'$ from a setpoint input impedance $Z_{ref}$ and the ascertained input impedance Z'. The difference is supplied to an impedance regulator 25, the output of which provides a setpoint duty cycle $D_{ref}$. The impedance regulator is configured as a PID controller, for example. The setpoint duty cycle $D_{ref}$ is supplied to the switching unit 20, which generates the control voltages $g_{1p}$, $g_{2p}$, $g_{1n}$ and $g_{2n}$ on the basis of the polarity signal P and the setpoint duty cycle $D_{ref}$. To this end, the switching unit 20 is configured as a digital pulse width modulator, for example.

The switching unit 20, the impedance detection unit 23, the subtractor 24 and the impedance regulator 25 form a control unit 26 that is part of an impedance control loop. The impedance control loop is used to set the input impedance Z such that it becomes purely resistive and the voltage $v_h$ and the current $i_h$ are substantially in phase. The input impedance Z is set by means of the duty cycle D. In discontinuous conduction mode, it holds for the input impedance that:

$$Z = \frac{2 \cdot f_s \cdot L}{D^2},$$

where $L=L_p$ or $L=L_n$. The setpoint input impedance $Z_{ref}$ is ascertained empirically in experiments, for example. The setpoint input impedance $Z_{ref}$ is particularly a resistance value at which a high level of efficiency, preferably a maximum efficiency, is achieved during energy generation.

The operation of the energy generator 1 is as follows:

The energy harvesting device 3 generates the voltage $v_h$ and the current $i_h$. By means of the measured voltage $v_h$, the polarity detection unit 19, detects whether the positive voltage $v_{hp}$ or the negative voltage $v_{hn}$ is applied to the input connections 6, 7, and provides an appropriate polarity signal P. By way of example, the polarity signal P is 1 if the positive voltage $v_{hp}$ is applied and 0 if the negative voltage $v_{hn}$ is applied.

When the positive voltage $v_{hp}$ is applied, the control device 5 realizes the first switching sequence. First of all, the switching elements $Q_{1p}$ and $Q_{2p}$ are switched on in the first switching state $Z_{1p}$, so that the current $i_h$ flows through the first coil $L_p$. The first blocking element $D_p$ prevents the current $i_h$ from flowing via the first capacitor $C_p$. In the first switching state $Z_{1p}$, the switching elements $Q_{1n}$ and $Q_{2n}$ are open. This is illustrated in FIG. 3.

In the subsequent second switching state $Z_{2p}$, the first coil $L_p$ drives a current $i_p$ via the first blocking element $D_p$, so that the first capacitor $C_p$ is charged. The first capacitor $C_p$ has the voltage $v_{cp}$ applied to it. On account of the voltage $v_{cp}$, a current $i_b$ flows that charges the galvanic energy store 8. In the second switching state $Z_{2p}$, the switching elements $Q_{1n}$ and $Q_{2n}$ are still open. This is illustrated in FIG. 4.

When the negative voltage $v_{hn}$ is applied, the control device 5 realizes the second switching sequence. First of all, the switching elements $Q_{1n}$ and $Q_{2n}$ are switched on in the first switching state $Z_{1n}$, so that the current $i_h$ flows through the second coil $L_n$. The second blocking element $D_n$ prevents the current $i_h$ from flowing via the second capacitor $C_n$. In the first switching state $Z_{1n}$, the switching elements $Q_{1p}$ and $Q_{2p}$ are open. This is illustrated in FIG. 5.

In the subsequent second switching state $Z_{2n}$, the second coil $L_n$ drives a current $i_n$ via the second blocking element $D_n$, so that the second capacitor $C_n$ is charged. The second capacitor $C_n$ has the voltage $v_{cn}$ applied to it. On account of the voltage $v_{cn}$, a current $i_b$ flows that charges the galvanic energy store 8. In the second switching state $Z_{2n}$, the switching elements $Q_{1p}$ and $Q_{2p}$ are still open. This is illustrated in FIG. 6.

The voltages $v_{cp}$ and $v_{cn}$ are used to charge the galvanic energy store 8, which provides the voltage $E_b$.

In the first switching sequence and the second switching sequence, the input impedance Z is regulated. To this end, the input impedance Z' is calculated from the digital voltage $v_h'$ and the digital current $i_h'$ by means of the impedance detection unit 23. The subtractor 24 generates the difference from the setpoint input impedance $Z_{ref}$ and the ascertained input impedance Z'. This difference is supplied to the impedance regulator 25, which provides the switching unit 20 with the setpoint duty cycle $D_{ref}$ as a manipulated variable. The switching unit 20 sets the timing of the switching signals or the control voltages $g_{1p}$, $g_{2p}$, $g_{1n}$ and $g_{2n}$ such that the respective first switching state $Z_{1p}$ or $Z_{1n}$ is set for the duration $0 < T \leq D \cdot T_S$ based on a period duration Ts and the respective second switching state $Z_{2p}$ or $Z_{2n}$ is set for the duration $D \cdot T_S < T < (1-D) \cdot T_S$.

Figure 7:
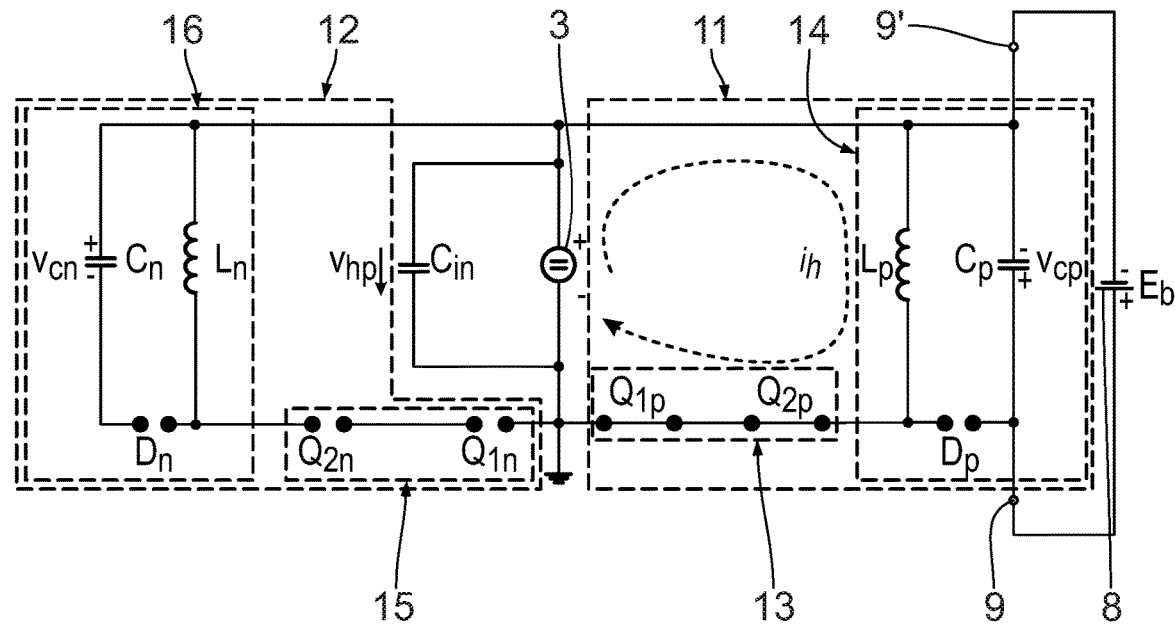
FIG. 7 shows a schematic depiction of a first switching state of the converter apparatus when an exclusively positive voltage of an energy harvesting device is applied to provide a voltage of constant polarity according to a second exemplary embodiment.
Figure 8:
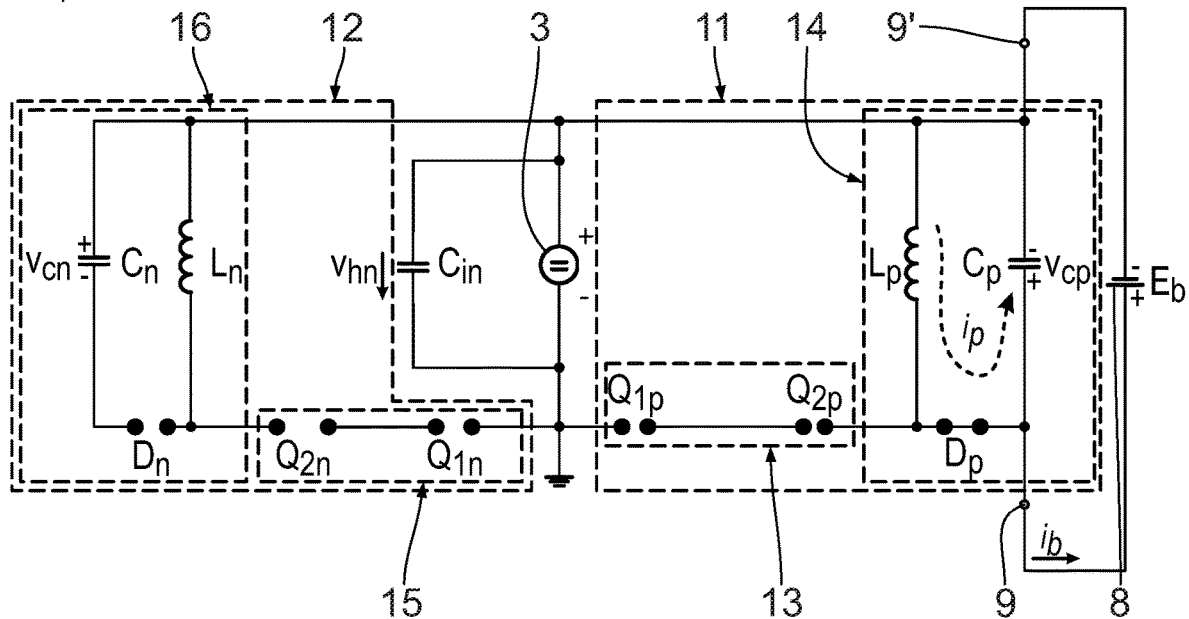
FIG. 8 shows a schematic depiction of a second switching state of the converter apparatus in FIG. 7.

There follows a description of a second exemplary embodiment of the invention with reference to FIGS. 7 and 8. In contrast to the first exemplary embodiment, the energy generator 1 has an energy harvesting device 3 that provides exclusively a positive voltage $v_{hp}$. The galvanic energy store 8 is connected to the first output connection 9 and the third output connection 9' of the converter 4. The second output connection 10 is not connected up in the second exemplary embodiment. The control device 5 realizes exclusively the first switching sequence. The first switching state $Z_{1p}$ is illustrated in FIG. 7 and the second switching state $Z_{2p}$ is illustrated in FIG. 8. For the further design and further manner of operation, reference is made to the description of the preceding exemplary embodiment.

The converter apparatus 2 according to the invention can be selectively operated with an energy harvesting device 3 that provides either a voltage $v_h$ of alternating polarity or exclusively a positive voltage $v_{hp}$ or exclusively a negative voltage $v_{hn}$. If the energy harvesting device 3 provides the voltage $v_h$ of alternating polarity, then the converter apparatus 2 operates as an AC/DC converter. This is illustrated in FIGS. 1 to 6. If the energy harvesting device 3 provides exclusively a positive voltage $v_{hp}$ or exclusively a negative voltage $v_{hn}$, on the other hand, then the converter apparatus 2 operates as a DC/DC converter. For the positive voltage $v_{hp}$, this is illustrated in FIGS. 7 and 8. For the negative voltage $v_{hn}$, the converter apparatus 2 operates in accordance with FIGS. 5 and 6.

The converter apparatus 2 according to the invention is based on a step-up converter. The converter apparatus 2 can be operated either with a DC voltage or with an AC voltage. The converter apparatus 2 is suitable for battery-operated appliances that harvest small amounts of electric power by means of an energy harvesting device 3. To optimize energy harvesting, the converter apparatus 2 allows the input impedance Z to be set such that it is purely resistive. The AC/DC conversion is effected in a stage without the use of a bridge rectifier. This avoids a voltage drop and energy losses, so that the converter apparatus 2 is also suitable for very low voltages $v_h$ of the energy harvesting device 3. The converter 4 has two electronic switching elements $Q_{1p}$, $Q_{2p}$ and $Q_{1n}$, $Q_{2n}$ per phase, so that direct conversion of an AC voltage into a DC voltage is possible and only one phase is required for the conversion of a DC voltage into a DC voltage. To set the input impedance Z, the converter apparatus 2 is operated in discontinuous conduction mode, so that the converter 4 appears as a purely nonreactive resistance to the energy harvesting device 3. The smoothing capacitor $C_{in}$ simplifies the ascertainment of the input impedance Z.

Since the source connections $S_{1p}$ and $S_{1n}$ have the same reference potential, a respective simple low-side gate driver can be used for the switching elements $Q_{1p}$ and $Q_{1n}$. For the switching elements $Q_{2p}$ and $Q_{2n}$, a respective floating gate driver is used. The voltage measurement, current measurement and polarity detection are simple, since the voltage measurement sensor 17, the current measurement sensor 18 and the polarity detection unit 19 use the same reference potential. The converter apparatus 2 can be operated together with a galvanic energy store 8 that allows a voltage of 3.7 V, 7.4 V or 12 V, for example. As a result, the converter apparatus 2 can be used for portable electronic appliances and for vehicles.

What is claimed is:

1. A converter apparatus for energy harvesting, the converter apparatus comprising:

a converter having a first input connection and a second input connection for connection to an energy harvesting device, a first output connection and a second output connection for connection to a galvanic energy storage, a first charging circuit for charging the galvanic energy storage with a positive voltage of the energy harvesting device that is applied to the input connections and a second charging circuit for charging the galvanic energy storage with a negative voltage of the energy harvesting device that is applied to the input connections, the first charging circuit having a first electronic switch and a first electrical energy storage connected in series with the first electronic switch, the second charging circuit having a second electronic switch and a second electrical energy storage connected in series with the second electronic switch; and a control device for actuating the first electronic switch and the second electronic switch on the basis of a polarity of the voltage of the energy harvesting device that is applied to the input connections, wherein the control device comprises a first switching sequence when a positive voltage is applied to the input connections, wherein it holds for the first switching sequence that:

|  | $Z_{1p}$ | $Z_{2p}$ |
| --- | --- | --- |
| $Q_{1p}$ | 1 | 0 |
| $Q_{2p}$ | 1 | 0 |
| $Q_{1n}$ | 0 | 0 |
| $Q_{2n}$ | 0 | 0 | wherein $Q_{1p}$ and $Q_{2p}$ denote two series-connected electronic switching elements of the first electronic switch, $Q_{1n}$ and $Q_{2n}$ denote two series-connected electronic switching elements of the second electronic Switch, $Z_{1p}$ and $Z_{2p}$ denote two successive switching states of the first switching sequence, and 1 means ON and 0 means OFF, wherein the control device comprises a second switching sequence when a negative voltage is applied to the input connections, wherein it holds for the second switching sequence that:

|  | $Z_{1n}$ | $Z_{2n}$ |
|---|---|---|
| $Q_{1p}$ | 0 | 0 |
| $Q_{2p}$ | 0 | 0 |
| $Q_{1n}$ | 1 | 0 |
| $Q_{2n}$ | 1 | 0 | wherein
$Q_{1p}$ and $Q_{2p}$ denote two series-connected electronic switching elements of the first electronic switch,
$Q_{1n}$ and $Q_{2n}$ denote two series-connected electronic switching elements of the second electronic switch,
$Z_{1n}$ and $Z_{2n}$ denote two successive switching states of the second switching sequence, and 1 means ON and 0 means OFF.

2. A converter apparatus according to claim 1, wherein the first charging circuit and the second charging circuit are connected in parallel with one another.

3. A converter apparatus according to claim 1, wherein the first energy storage is connected to the first output connection and the second energy storage is connected to the second output connection.

4. A converter apparatus according to claim 1, wherein one of the input connections is connected to a reference node.

5. A converter apparatus according to claim 1, wherein the first electronic switch comprises a series circuit containing a first electronic switching element and a second electronic switching element.

6. A converter apparatus according to claim 5, wherein a first inverse diode configured in parallel with the first electronic switching element and a second inverse diode configured in parallel with the second electronic switching element have opposite reverse directions.

7. A converter apparatus according to claim 1, wherein the second electronic switch comprises a series circuit containing a third electronic switching element and a fourth electronic switching element.

8. A converter apparatus according to claim 7, wherein a third inverse diode configured in parallel with the third electronic switching element and a fourth inverse diode configured in parallel with the fourth electronic switching element have opposite reverse directions.

9. A converter apparatus according to claim 1, wherein the first energy storage comprises a first coil, a first capacitor and a first blocking element.

10. A converter apparatus according to claim 1, wherein the second energy storage comprises a second coil, a second capacitor and a second blocking element.

11. A converter apparatus according claim 1, wherein the first energy storage comprises a first capacitor and the second energy storage comprises a second capacitor, wherein the first capacitor and the second capacitor are connected to a respective one of the output connections.

12. A converter apparatus according to claim 1, wherein a smoothing capacitor is connected in parallel with the input connections.

13. A converter apparatus according to claim 1, wherein the control device comprises a polarity detection unit for detecting a positive voltage and a negative voltage of the energy harvesting device.

14. A converter apparatus according to claim 1, wherein the control device comprises an impedance regulator for setting an input impedance, which impedance regulator alters the actuation of the electronic switches on the basis of an ascertained input impedance and a setpoint input impedance.

15. An energy generator comprising: a converter apparatus for energy harvesting, the converter apparatus comprising a converter having a first input connection and a second input connection for connection to an energy harvesting device, a first output connection and a second output for connection to a galvanic energy storage, a first charging circuit for charging the galvanic energy storage with a positive voltage of the energy harvesting device that is applied to the input connections and a second charging circuit for charging the galvanic energy storage with a negative voltage of the energy harvesting device that is applied to the input connections, the first charging circuit having a first electronic switch and a first electrical energy storage connected in series with the first electronic switch, the second charging circuit having a second electronic switch and a second electrical energy storage connected in series with the second electronic switch; and a control device for actuating the first electronic switch and the second electronic switch on the basis of a polarity of the voltage of the energy harvesting device that is applied to the input connections, and the energy harvesting device, connected to the input connections, for providing a voltage, wherein the control device comprises a first switching sequence when a positive voltage is applied to the input connections, wherein it holds for the first switching sequence that:

|  | $Z_{1p}$ | $Z_{2p}$. |
|---|---|---|
| $Q_{1p}$ | 1 | 0 |
| $Q_{2p}$ | 1 | 0 |
| $Q_{1n}$ | 0 | 0 |
| $Q_{2n}$ | 0 | 0 | wherein
$Q_{1p}$ and $Q_{2p}$ denote two series-connected electronic switching elements of the first electronic switch,
$Q_{1n}$ and $Q_{2n}$ denote two series-connected electronic switching elements of the second electronic Switch,
$Z_{1p}$ and $Z_{2p}$ denote two successive switching states of the first switching sequence, and 1 means ON and 0 means OFF,
wherein the control device comprises a second switching sequence when a negative voltage is applied to the input connections, wherein it holds for the second switching sequence that:

|  | $Z_{1n}$ | $Z_{2n}$ |
|---|---|---|
| $Q_{1p}$ | 0 | 0 |
| $Q_{2p}$ | 0 | 0 |
| $Q_{1n}$ | 1 | 0 |
| $Q_{2n}$ | 1 | 0 | wherein
$Q_{1p}$ and $Q_{2p}$ denote two series-connected electronic switching elements of the first electronic switch,
$Q_{1n}$ and $Q_{2n}$ denote two series-connected electronic switching elements of the second electronic switch,
$Z_{1n}$ and $Z_{2n}$ denote two successive switching states of the second switching sequence, and 1 means ON and 0 means OFF.

16. A method, comprising: providing a converter apparatus comprising a converter having a first input connection and a second input connection for connection to an energy harvesting device, a first output connection and a second output connection for connection to a galvanic energy storage, a first charging circuit for charging the galvanic energy storage with a positive voltage of the energy harvesting device that is applied to the input connections and a second charging circuit for charging the galvanic energy storage with a negative voltage of the energy harvesting device that is applied to the input connections, the first charging circuit having a first electronic switch and a first electrical energy storage connected in series with the first electronic switch, the second charging circuit having a second electronic switch and a second electrical energy storage connected in series with the second electronic switch, the converter apparatus further comprising a control device for actuating the first electronic switch and the second electronic on the basis of a polarity of the voltage of the energy harvesting device that is applied to the input connections; and selectively providing one of a voltage of the same polarity and a voltage of alternating polarity via the energy harvesting device, wherein the control device comprises a first switching sequence when a positive voltage is applied to the input connections, wherein it holds for the first switching sequence that:

|  | $Z_{1p}$ | $Z_{2p}.$ |
| --- | --- | --- |
| $Q_{1p}$ | 1 | 0 |
| $Q_{2p}$ | 1 | 0 |
| $Q_{1n}$ | 0 | 0 |
| $Q_{2n}$ | 0 | 0 | wherein
$Q_{1p}$ and $Q_{2p}$ denote two series-connected electronic switching elements of the first electronic switch,
$Q_{1n}$ and $Q_{2n}$ denote two series-connected electronic switching elements of the second electronic Switch,
$Z_{1p}$ and $Z_{2p}$ denote two successive switching states of the first switching sequence, and 1 means ON and 0 means OFF,
wherein the control device comprises a second switching sequence when a negative voltage is applied to the input connections, wherein it holds for the second switching sequence that:

|  | $Z_{1n}$ | $Z_{2n}$ |
| --- | --- | --- |
| $Q_{1p}$ | 0 | 0 |
| $Q_{2p}$ | 0 | 0 |
| $Q_{1n}$ | 1 | 0 |
| $Q_{2n}$ | 1 | 0 | wherein
$Q_{1p}$ and $Q_{2p}$ denote two series-connected electronic switching elements of the first electronic switch,
$Q_{1n}$ and $Q_{2n}$ denote two series-connected electronic switching elements of the second electronic switch,
$Z_{1n}$ and $Z_{2n}$ denote two successive switching states of the second switching sequence, and 1 means ON and 0 means OFF.

\* \* \* \* \*